United States Patent
Noguchi et al.

(10) Patent No.: US 6,763,185 B2
(45) Date of Patent: Jul. 13, 2004

(54) CAMERA AND SHUTTER DEVICE

(75) Inventors: Osamu Noguchi, Kanagawa (JP); Yuji Mikami, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/419,792

(22) Filed: Apr. 22, 2003

(65) Prior Publication Data
US 2003/0206738 A1 Nov. 6, 2003

Related U.S. Application Data

(62) Division of application No. 10/166,682, filed on Jun. 12, 2002, now Pat. No. 6,701,078.

(30) Foreign Application Priority Data

| Jun. 12, 2001 | (JP) | 2001-177471 |
| Jun. 12, 2001 | (JP) | 2001-177472 |
| Jun. 12, 2001 | (JP) | 2001-177473 |
| Aug. 2, 2001 | (JP) | 2001-235305 |

(51) Int. Cl.[7] .................................................. G03B 9/64
(52) U.S. Cl. .......................................... 396/6; 396/473
(58) Field of Search ........................... 396/6, 472, 473

(56) References Cited

U.S. PATENT DOCUMENTS 6,442,343 B2   8/2002  Kameyama et al.
6,561,704 B2 * 5/2003  Richiuso et al. ............ 396/472

* cited by examiner

Primary Examiner—David M. Gray
(74) Attorney, Agent, or Firm—Young & Thompson

(57) ABSTRACT

A camera includes a movable aperture stop plate, which changes over a light path of object light between plural stop states. A depressible shutter release button is provided. A shutter mechanism is released in response to depression of the shutter release button after a charging operation and changing over the movable aperture stop plate, to provide an exposure to the photo film. A photometric circuit including a CdS element measures object brightness adapted for changing over the movable aperture stop plate. A photometric switch includes first and second switch segments, is turned on when pressed, to supply the photometric circuit with power. A blocking pin blocks and turns off the first and second switch segments upon completion of the charging operation of the shutter mechanism, and comes away from the photometric switch when the shutter release button is depressed.

4 Claims, 15 Drawing Sheets

CAMERA AND SHUTTER DEVICE

This application is a division of application Ser. No. 10/166,682, filed on Jun. 12, 2002, the entire contents of which are hereby incorporated by reference now U.S. Pat. No. 6,701,018.

BACKGROUND OF THE INVENTION

1. Field of the Invention

The present invention relates to a camera and shutter device. More particularly, the present invention relates to a camera in which an aperture stop is changed over according to object brightness, and an exposure is taken after the aperture stop is set, and a shutter device.

2. Description Related to the Prior Art

A lens-fitted photo film unit is known in the field of photograph as a camera of simple type, and pre-loaded with photo film in the course of manufacture. A lens in the lens-fitted photo film unit is a fixed focus type for the purpose of reducing a cost and structure. For the same purpose, a shutter in the lens-fitted photo film unit is a knocking type in which a shutter blade opens and shuts upon knocking operation, and of which a shutter speed is fixed. However, brightness of a photographic object may be totally different between various types of scene to be photographed. The brightness may be very low because of weak illumination in an indoor scene, or very high because of strong illumination in an outdoor scene. An exposure amount must be adjusted for the purpose of an exposure in any level of brightness. There has been a suggested lens-fitted photo film unit in which a photometric circuit is incorporated for measuring object brightness, and an exposure amount can be adjusted by changing over an aperture stop mechanism according to the measured object brightness.

The aperture stop changer device includes CdS element, solar cell or other photometric elements for measuring light from a photographic object to obtain object brightness. The object brightness is compared with reference brightness level, to drive a solenoid to set an aperture stop plate into or out of a photographic light path automatically. The measurement of object brightness is synchronized with turning on of the photometric switch by means of switching member movable in response to depression of a shutter release button. A widely used type of the photometric switch is a leaf switch because of a simple structure and a low cost. A pair of switch segments constitute the leaf switch, have conductivity and flexibility. A first one of the segments is depressed and caused to contact a second one of those, to turn on the photometric switch. When those segments are away from one another, the photometric switch is turned off.

However, it is likely in the known camera that the photometric switch in a form of leaf switch is turned on accidentally upon occurrence of external shock or vibration to a camera body. The photometric circuit and solenoid may be actuated in connection with the photometric switch.

SUMMARY OF THE INVENTION

In view of the foregoing problems, an object of the present invention is to provide a camera in which measurement of object brightness to change over the aperture stop can be effected safely without being influenced by shock or vibration, and a shutter device.

Another object of the present invention is to provide a camera in which a shutter mechanism can be actuated stably with sufficient delay time, and a shutter device.

A further object of the present invention is to provide a camera in which assembly of relevant elements can be facilitated even in a structure with a flash unit and an aperture stop changer mechanism, and a shutter device.

Still another object of the present invention is to provide a camera in which plural units in which relevant elements are combined can ensure suitability to recycling by disassembly and assembly, and a shutter device.

In order to achieve the above and other objects and advantages of this invention, a camera includes an aperture stop mechanism for changing over a photographic light path of object light between plural stop states, a depressible shutter release button, and a shutter mechanism for being released in response to depression of the shutter release button after a charging operation and changing over the aperture stop mechanism, to provide an exposure to the photo film. In the camera, a photometric circuit measures object brightness adapted for changing over the aperture stop mechanism. A photometric switch includes first and second switch segments, is turned on when pressed, to supply the photometric circuit with power. A first blocking mechanism blocks and turns off the first and second switch segments upon completion of the charging operation of the shutter mechanism, and comes away from the photometric switch when the shutter release button is depressed. A shifting mechanism presses and turns on the photometric switch after the first blocking mechanism comes away from the photometric switch.

Furthermore, a second blocking mechanism blocks the first and second switch segments from one another when the shutter mechanism is actuated, to keep the photometric switch turned off until a start of the charging operation of the shutter mechanism.

Furthermore, a delay mechanism is shifted to a charged position by winding operation of the photo film, and is shifted to a released position in response to the depression of the shutter release button, to actuate the shutter mechanism. The first blocking mechanism is moved according to shifting of the delay mechanism, keeps the photometric switch turned off when the delay mechanism is in the charged position, and comes away from the photometric switch when the delay mechanism is in the released position.

Furthermore, a switch gear rotates according to shifting of the delay mechanism. The first blocking mechanism is a blocking pin, the shifting mechanism is a shifting projection, and the blocking pin and the shifting projection are formed to protrude from the switch gear.

The first switch segment is offset from a moving path of the blocking pin and the shifting projection, and is free therefrom. The second switch segment has a portion disposed in the moving path, has a springy characteristic, is pushed by the shifting projection while the delay mechanism is shifted between the charged and released positions, and subsequently returns to an original state with resiliency.

The delay mechanism includes a tooth train portion having plural teeth arranged along an arc. Furthermore, a transmission gear portion is formed with the switch gear, meshed with the tooth train portion, for rotating.

The delay mechanism includes a delay lever movable pivotally. The second blocking mechanism is a second blocking pin formed to protrude from the delay lever.

It is therefore possible that measurement of object brightness to change over the aperture stop is effected safely without being influenced by shock or vibration, because the first blocking mechanism reliably blocks and turns off the first and second switch segments.

According to another aspect of the invention, a shutter device comprises a shutter release button. A delay lever moves from a charged position toward a released position in response to depression of the shutter release button, and reaches the released position upon lapse of a delay time. A shutter drive lever moves from a first position toward a second position when the delay lever reaches the released position. A shutter blade is driven by the shutter drive lever moving toward the second position, for opening and shutting a light path. A friction mechanism provides braking operation to the delay lever by frictional contact therewith, to set the delay time long.

Furthermore, a tooth train portion is formed with the delay lever. A governor mechanism is meshed with the tooth train portion, for regulating rotation at a predetermined speed, to set the delay time long.

The friction mechanism includes a bias spring for biasing the shutter drive lever toward the second position. A friction portion is formed with the shutter drive lever, and pressed against the delay lever by the bias spring.

The governor mechanism includes a transmission gear portion, meshed with the tooth train portion, for rotating. An escapement wheel portion is formed with the transmission gear portion, for constituting a switch gear. An ankle member is meshed with the escapement wheel portion, for restricting rotation thereof.

Thus, it is possible that the shutter mechanism is actuated stably with sufficient delay time, because the friction mechanism frictionally contacts to the delay lever.

According to a further aspect of the invention, a camera having a flash circuit board is provided. A large stop opening is disposed in a light path in a stationary manner. A movable aperture stop plate has a small stop opening smaller than the large stop opening, being movable between a large aperture position and a small aperture position, the movable aperture stop plate, when in the large aperture position, being offset from the light path, and when in the small aperture position, setting the small stop opening in the light path. An aperture stop plate shifter is secured to the flash circuit board, for shifting the movable aperture stop plate between the large aperture position and the small aperture position.

Furthermore, a photometric circuit measures brightness of a photographic object, and determines whether the brightness is low brightness lower than a predetermined level, or is high brightness equal to or higher than the predetermined level. The aperture stop plate shifter sets the movable aperture stop plate in the large aperture position if the low brightness is determined, and sets the movable aperture stop plate in the small aperture position if the high brightness is determined.

Furthermore, there is a depressible shutter release button. A shutter mechanism is released in response to depression of the shutter release button after a charging operation and changing over the movable aperture stop plate, to provide an exposure to the photo film. A synchronizing mechanism synchronizes the shutter mechanism with the aperture stop plate shifter, to disable the movable aperture stop plate from shifting upon completion of the charging of the shutter mechanism, to cause the movable aperture stop plate to shift after the depression of the shutter release button and before starting an exposing operation of the shutter mechanism, and to keep the movable aperture stop plate shifted during the exposing operation of the shutter mechanism.

The aperture stop plate shifter includes a stop changer lever, movable between first and second angular positions, for shifting the movable aperture stop plate when in the first angular position, and for coming away from the movable aperture stop plate when in the second angular position. A movable stopper shifts between a disabling position and an enabling position according to an output of the photometric circuit, to keep the stop changer lever in the first angular position when in the disabling position, and to enable the stop changer lever to shift to the second angular position when in the enabling position.

Furthermore, a delay lever rotates from a charged position to a released position in response to the depression of the shutter release button, for actuating the shutter mechanism with delay. The synchronizing mechanism includes a switch gear for being rotated by the delay lever. A transmission lever shifts the stop changer lever by rotating. A retention ridge is formed to protrude from the switch gear, for retaining the transmission lever when the delay lever is in the charged position, and for releasing and enabling the transmission lever to rotate when the delay lever is in the released position.

The movable stopper includes a solenoid. A stopper lever is moved by the solenoid, offset from a moving path of the stop changer lever when in the enabling position, and set in the moving path when in the disabling position.

Furthermore, a support member is secured fixedly to the flash circuit board, for supporting the stop changer lever and the movable stopper.

Furthermore, an operable button member is disposed to emerge outside a camera body, for shifting the stop changer lever between the first and second angular positions.

It is therefore possible that assembly of relevant elements is facilitated even in a structure with a flash unit and an aperture stop changer mechanism, because the aperture stop plate shifter is secured to the flash circuit board.

According to still another aspect of the invention, a camera includes a flash emitter for applying flash light to a photographic object, a taking lens for introducing object light from the object, an aperture stop mechanism for changing over a light path of the object light between plural stop states, an aperture stop actuator for driving the aperture stop mechanism, a shutter mechanism for providing an exposure to photo film with the object light. In the camera, an exposure unit includes the shutter mechanism. A flash unit includes the flash emitter and the aperture stop actuator. A lens unit is secured to a front of the exposure unit, and includes the taking lens and the aperture stop mechanism.

Furthermore, a depressible shutter release button is adapted for releasing the shutter mechanism. The exposure unit further includes a light-shielded tunnel for covering the light path, and having the shutter mechanism secured thereto. A shifting mechanism moves from an off-position to an on-position after depression of the shutter release button and before completion of releasing the shutter mechanism. The flash unit further includes a photometric circuit for measuring object brightness of the object, and for outputting a signal for controlling the aperture stop actuator according to the object brightness. A photometric switch is turned on in response to movement of the shifting mechanism to the on-position, to supply the photometric circuit with power.

The camera is a lens-fitted photo film unit. Furthermore, a main body has a cassette holder chamber and a photo film holder chamber, the cassette holder chamber being loaded with a cassette, the photo film holder chamber being loaded with the photo film, and having the exposure unit secured thereto.

Thus, it is possible that plural units in which relevant elements are combined ensure suitability to recycling by disassembly and assembly, because the aperture stop actuator is included in the flash unit in contrast with the aperture stop mechanism included in the lens unit.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
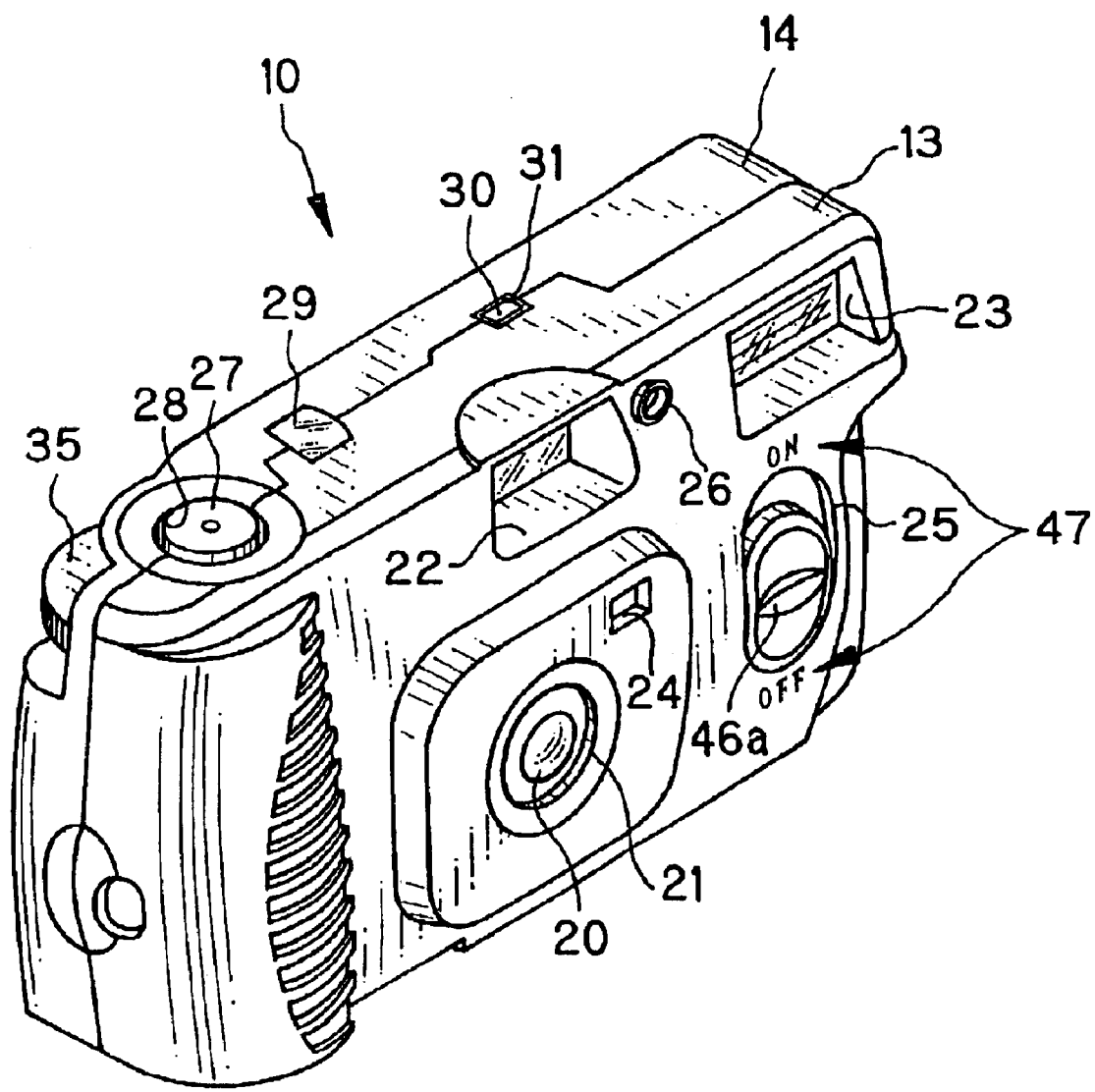
FIG. 1 is a perspective illustrating a lens-fitted photo film unit.
Figure 2:
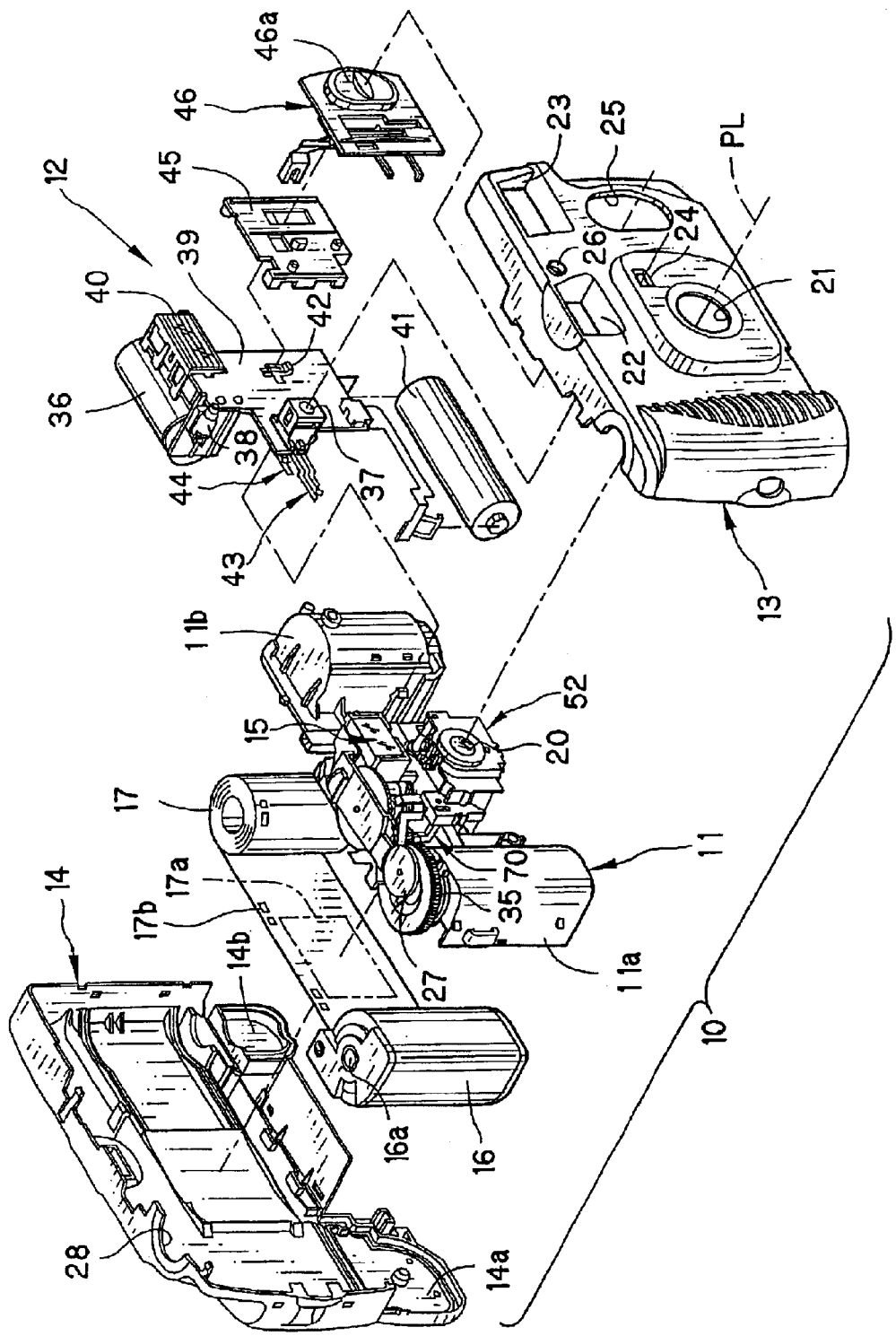
FIG. 2 is an exploded perspective illustrating the lens-fitted photo film unit.

In FIGS. 1 and 2, a lens-fitted photo film unit 10 is illustrated. A main body 11 in the lens-fitted photo film unit 10 includes various elements for taking exposures, and is provided with an electronic flash unit 12. A front cover 13 and a rear cover 14 are fitted to cover the front and rear of the main body 11 and the flash unit 12. An exposure unit 15 or mechanical unit is disposed in the center of the main body 11. The flash unit 12 is disposed beside the exposure unit 15. In the main body 11 are formed a cassette holder chamber 11a and a photo film holder chamber 11b, between which the exposure unit 15 is disposed. A photo film cassette 16 is inserted in the cassette holder chamber 11a. A photo film 17 is drawn from the photo film cassette 16, wound in a roll form and set in the photo film holder chamber 11b in the course of manufacture.

In the front cover 13 are formed a front opening 21, a viewfinder objective window 22, a flash emitter window 23, a photometric window 24, an opening 25 and a second photometric window 26 for flash light control. A taking lens 20 appears in the front opening 21. Bottom lids 14a and 14b are formed with the rear cover 14, and close lower openings of the cassette holder chamber 11a and the photo film holder chamber 11b. The bottom lid 14a is opened at the time of removing the photo film cassette 16 containing the photo film 17 after exposures. In upper portions of the front cover 13 and the rear cover 14, there are formed an opening 28, a frame counter window 29 and a readiness indicator window 31. A shutter release button 27 appears in the opening 28. A light guide 30 for optically guiding light is movable out of the readiness indicator window 31.

A winder wheel 35 is disposed on an upper wall of the cassette holder chamber 11a. A portion of the winder wheel 35 protrudes through the rear cover 14 toward the rear. A shaft portion (not shown) is formed to protrude from a lower surface of the winder wheel 35. A spool 16a in the photo film cassette 16 is engaged with the shaft portion. The winder wheel 35 is rotated at each time after taking one exposure, to move the photo film 17 toward the inside of the photo film cassette 16 by one frame.

The flash unit 12 includes a flash circuit board 39, a flash emitter 40, a battery 41, a flash charger switch 42, a sync switch 43 and a photometric switch 44. On the flash circuit board 39 are mounted a main capacitor 36, a CdS element 37 in a photometric circuit, a photometric element 38 and various circuit elements. The flash emitter 40 includes a flash discharge tube and a reflector. A circuit pattern is printed on the flash circuit board 39, and includes a well-known flash circuit, a photometric circuit, a light adjusting circuit and the like. The photometric circuit receives light and measures object brightness. The light adjusting circuit measures reflected flash light, and quenches flash emission when an amount of the reflected flash light comes up to a predetermined level.

An operation button 46 is disposed in front of the flash circuit board 39. A support plate 45 keeps the operation button 46 slidable up and down. A pushbutton portion 46a is included in the operation button 46, and inserted in the opening 25. The pushbutton portion 46a is slid manually by a user, to change over the operation button 46. Two set positions 47 are indicated with letters of OFF and ON, determined in portions of the front cover 13, and adapted for positioning the operation button 46 for setting a selected one of two states.

When the pushbutton portion 46a is set in the OFF position, the flash circuit does not operate. When the pushbutton portion 46a is set in the ON position, a projection (not shown) on the rear of the operation button 46 pushes and turns on the flash charger switch 42. The flash circuit operates, to charge the main capacitor 36 and a trigger capacitor. When voltage across the main capacitor 36 comes up to a prescribed voltage level, a neon tube or LED (light-emitting diode) is driven to emit light. The light emitted by the neon tube is guided through the light guide 30, and emanated by an outer end of the light guide 30, to inform a user of completion of the charging.

When the sync switch 43 is turned on, the trigger capacitor is discharged. In response to this, charge having been stored in the main capacitor 36 passes through a flash discharge tube, to emit flash light toward a photographic object. In the light adjusting circuit, the photometric element 38 receives reflected flash light behind the second photometric window 26 formed in the front cover 13. When an amount of received light comes up and reaches a predetermined amount, flash emission is quenched.

Figure 3:
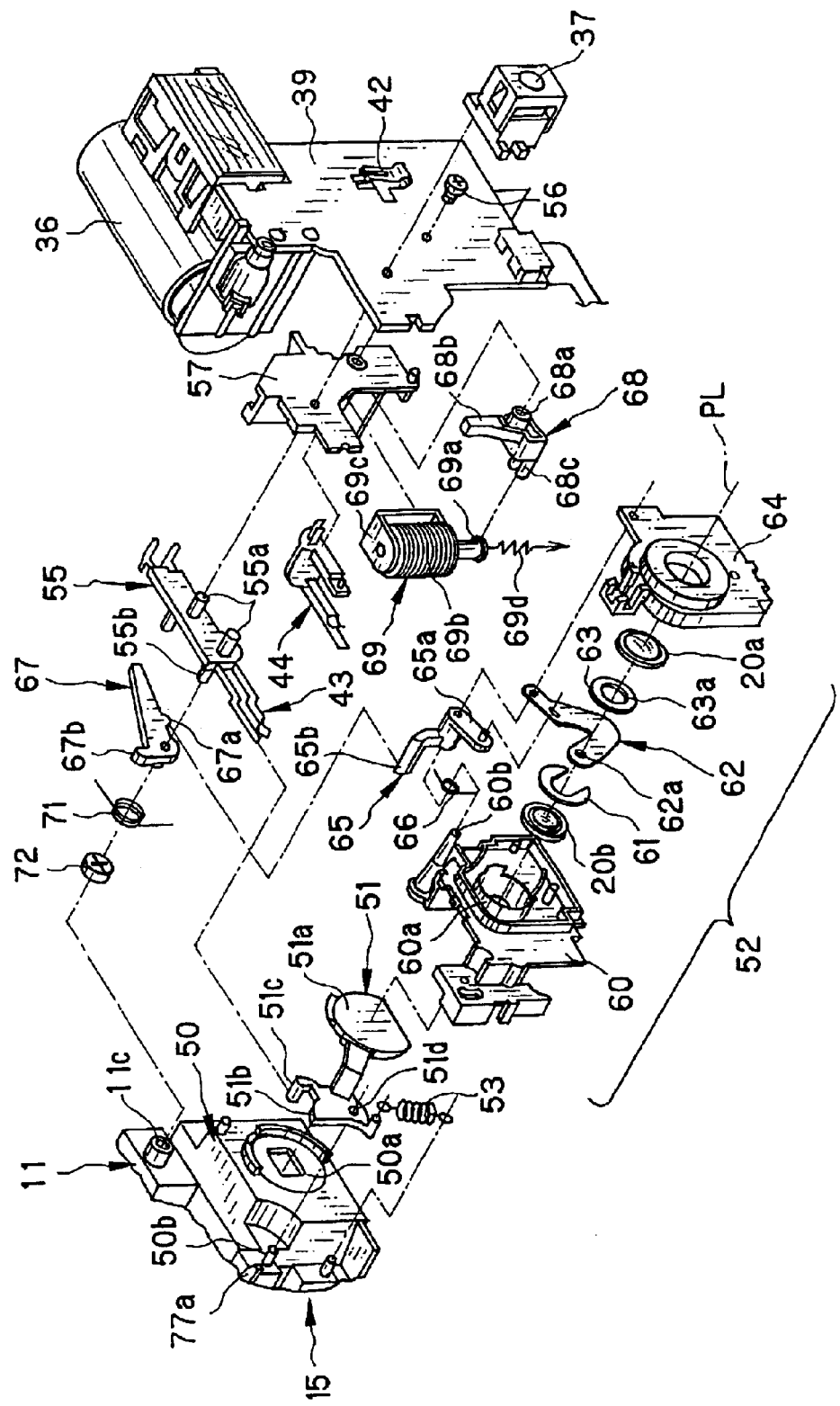
FIG. 3 is an exploded perspective illustrating elements in FIGS. 1 and 2 and including an exposure unit, a lens unit and a flash circuit board.

In FIG. 3, a light-shielded tunnel 50 constitutes a base portion of the exposure unit 15, has an angular tubular shape protruding to the front. Elements are mounted on the light-shielded tunnel 50, including a shutter mechanism, photo film one-frame winding mechanism, viewfinder mechanism, frame counter disk and the like. An exposure aperture (not shown) is formed in a rear wall of the light-shielded tunnel 50. A frame or exposure region 17a is defined by the exposure aperture in the photo film 17 behind the same.

In FIG. 3, a shutter opening 50a is formed in a front wall of the light-shielded tunnel 50. A shutter blade 51 and a lens unit 52 are secured to the light-shielded tunnel 50 in front of the shutter opening 50a. The shutter blade 51 includes a blade portion 51a, a driven portion 51b and a switching portion 51c. The blade portion 51a shuts the shutter opening 50a in an openable manner. A pivotal pin 50b protrudes from the front of the light-shielded tunnel 50. A pivotal hole 51d is formed in the shutter blade 51, receives the pivotal pin 50b to keep the shutter blade 51 rotatable. A return spring 53 is connected between the shutter blade 51 and the light-shielded tunnel 50, to bias the shutter blade 51 in a direction for the blade portion 51a to shut the shutter opening 50a.

A shutter mechanism 75 includes a shutter drive lever 77 to be described later. A knocking arm 77a extends from the shutter drive lever 77 in such a manner that the driven portion 51b lies in a moving path of the knocking arm 77a. When the shutter release button 27 is depressed, the knocking arm 77a knocks the driven portion 51b to the right. The shutter blade 51 rotates clockwise against the bias of the return spring 53, and comes to the open position where the shutter opening 50a is uncovered from the blade portion 51a. The bias of the return spring 53 causes the shutter blade 51 to rotate in the counterclockwise direction, before the blade portion 51a comes to the shut position when the shutter opening 50a is shut. Thus, the shutter opening 50a is opened and shut.

The sync switch 43 of the flash unit 12 is disposed to extend into a path of movement of the switching portion 51c. When the shutter blade 51 comes to the open position, the switching portion 51c pushes and turns on the sync switch 43. Thus, flash light is emitted in synchronism with movement of the shutter blade 51. A support member 57 is disposed behind the flash circuit board 39. A screw 56 fastens the support member 57 to the flash circuit board 39. A base board 55 supports the sync switch 43. A pair of bosses 55a are formed on the front of the base board 55, and fastened to the flash circuit board 39 indirectly with the support member 57. So the sync switch 43 is positioned at the moving path of the switching portion 51c by fixation with the screw 56.

The lens unit 52 includes the taking lens 20, a base member 60, a spacer ring 61, a movable aperture stop plate 62, a stationary aperture stop ring 63, and a lens retention panel 64. An aperture stop mechanism is constituted by the movable aperture stop plate 62 and the stationary aperture stop ring 63. The taking lens 20 includes a front lens element 20a and a rear lens element 20b. A lens holder portion 60a is formed in the base member 60 in a tubular shape, and receives insertion of the rear lens element 20b, the spacer ring 61, the movable aperture stop plate 62, the stationary aperture stop ring 63 and the front lens element 20a in sequence. The lens retention panel 64 firmly retains those elements in the lens holder portion 60a.

The movable aperture stop plate 62 has an L shape. A small stop opening 62a is formed in an end portion of the movable aperture stop plate 62. A driven arm 65 includes a connection portion 65a, to which the movable aperture stop plate 62 is secured fixedly. A support shaft 60b protrudes from the base member 60, and supports the movable aperture stop plate 62 and the driven arm 65 in a rotatable manner. A torsion coil spring 66 is connected with the driven arm 65, and biases the movable aperture stop plate 62 toward a small aperture position where the small stop opening 62a is set on in the photographic light path PL. A large stop opening 63a is formed in the stationary aperture stop ring 63, and has a greater diameter than that of the small stop opening 62a in the movable aperture stop plate 62. The movable aperture stop plate 62 is movable between the small aperture position and a large aperture position, and when in the small aperture position, sets the small stop opening 62a in the light path PL, and when in the large aperture position, sets the small stop opening 62a away from the light path PL. Thus, the aperture stop can be changed over between the large and small aperture stop states.

An aperture stop changer mechanism 70 includes the CdS element 37, the photometric switch 44, a stop changer lever 67, a stopper lever 68 and a solenoid 69. The stop changer lever 67 constitutes an aperture stop plate shifter. The stopper lever 68 and the solenoid 69 constitute a movable stopper. A driven portion 65b is formed with the driven arm 65. A driving projection 67a projects from the stop changer lever 67, and contacts the driven portion 65b. Also, an engagement projection 67b projects from the stop changer lever 67, and is retained by a transmission lever, which will be described later. A boss 55b projects from a rear of the base board 55, and is inserted in a hole in the stop changer lever 67, which is supported in a rotatable manner. A receiving hole 11c is formed in the main body 11. The boss 55b is combined with a torsion coil spring 71 and a holder 72, and inserted in the receiving hole 11c.

The stop changer lever 67 is biased by the torsion coil spring 71 in the clockwise direction, for the driving projection 67a to push the driven portion 65b of the driven arm 65. The torsion coil spring 71 is provided with higher force than that of the torsion coil spring 66 biasing the movable aperture stop plate 62. The torsion coil spring 71 biases the movable aperture stop plate 62 in the counterclockwise direction against the bias of the torsion coil spring 66.

The stopper lever 68 is disposed under an end of the stop changer lever 67. The stopper lever 68 includes a shaft 68a, a projection 68b, and an engagement portion 68c. A projection (not shown) projects from the support member 57, and supports the stopper lever 68 in a rotatable manner. A plunger 69a of iron is provided in the solenoid 69, and is disposed behind the stopper lever 68. The engagement portion 68c is fitted on the plunger 69a. The stopper lever 68 is disposed to rotate in a manner coplanar with the stop changer lever 67 in response to turning on and off of the solenoid 69. The stopper lever 68 is movable between a disabling position and an enabling position, and when in the disabling position, sets the projection 68b to extend into a moving path of the stop changer lever 67 for retention, and when in the enabling position, is away from the moving path to enable the stop changer lever 67 to rotate.

The solenoid 69 is constituted by the plunger 69a, a winding 69b, a holder frame 69c and a return spring 69d.

The holder frame 69c is engaged with an engaging claw (not shown) formed with the support member 57. The plunger 69a is kept slidable in the winding 69b, and is biased by the return spring 69d toward a lower position where the plunger 69a protrudes downwards from the winding 69b. The solenoid 69 is a type in which powering of the winding 69b creates magnetic field to move back the plunger 69a to the inside of the winding 69b. To this end, the CdS element 37 measures object brightness, according to which a photometric circuit outputs a signal to control powering of the winding 69b.

The photometric circuit is constituted by the CdS element 37, a switching transistor, the photometric switch 44 and the like. The CdS element 37 is a photoelectric element of which resistance changes according to brightness or intensity of incident light, and is disposed on the front of the flash circuit board 39 at the photometric window 24 in the front cover 13. The switching transistor (not shown) is connected at a line through which the battery 41 supplies the solenoid 69 with power, and causes a current to flow to the winding 69b selectively according to a level of a photometric value of the object brightness. The photometric switch 44 is fastened to the flash circuit board 39 by the support member 57. A switch gear 90 to be described later is connected with the shutter mechanism. A shifting projection 90d protrudes from the switch gear 90 in such a manner that the photometric switch 44 extends into a path of moving the shifting projection 90d. When the photometric switch 44 is turned on, the photometric circuit is powered and measures object brightness.

Note that a predetermined level of the object brightness enough for actuating the solenoid 69 is predetermined according to the aperture stop value of the optical system. Also, it is possible that the movable aperture stop plate 62 is set away from the light path when in the normal state, and is set in the light path only when the object brightness is higher than the predetermined level.

Figure 4:
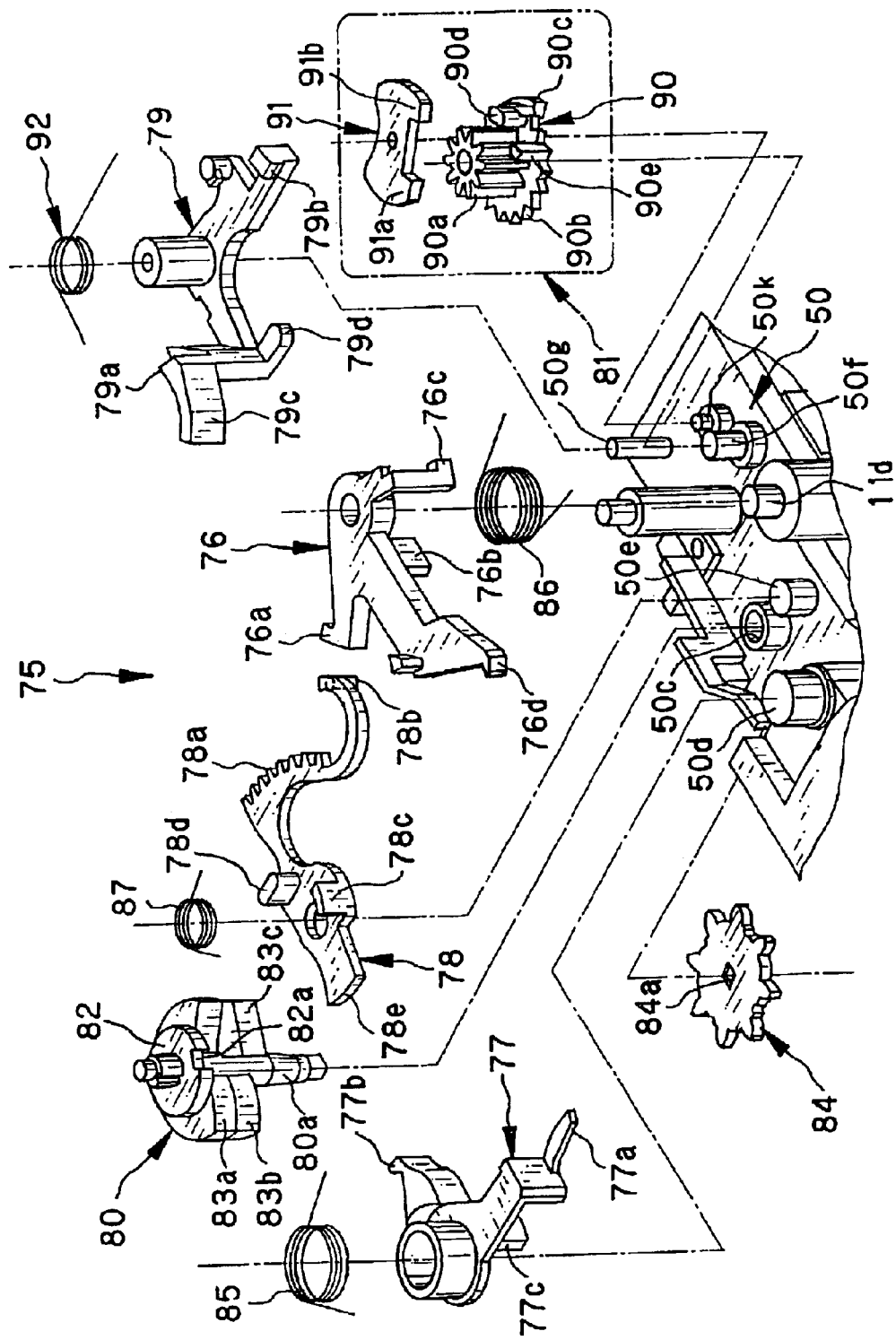
FIG. 4 is an exploded perspective illustrating the shutter mechanism.

In FIG. 4, the shutter mechanism 75 is secured to an upper side of the light-shielded tunnel 50, and includes a retention lever 76, the shutter drive lever 77, a delay lever 78 in a delay mechanism, a transmission lever 79 or charge lever, a cam 80 and a governor mechanism 81. The cam 80 includes a pivot 80a, a disk 82, a first cam portion 83a, a second cam portion 83b and a third cam portion 83c. A notch 82a is formed in the disk 82. The three cam portions 83a, 83b and 83c are formed with a lower side of the disk 82, and have a sector shape.

A hole 50c is formed in the light-shielded tunnel 50, and receives the pivot 80a of the cam 80. There is an engagement hole 84a in a sprocket wheel 84. A lower end portion of the pivot 80a is engaged with the engagement hole 84a. Perforations 17b are formed in the photo film 17. Plural teeth on the periphery of the sprocket wheel 84 are meshed with the perforations 17b. Thus, the movement of the photo film 17 rotates the sprocket wheel 84 in the counterclockwise direction, and causes the cam 80 to rotate.

A pin 50d projects from the light-shielded tunnel 50, and supports the shutter drive lever 77 in a rotatable manner. A torsion coil spring 85 in the friction mechanism biases the shutter drive lever 77 in the counterclockwise direction. A hook 77b and a friction projection 77c are formed with the shutter drive lever 77 as well as the knocking arm 77a. When the shutter release button 27 is depressed, the knocking arm 77a knocks the driven portion 51b of the shutter blade 51 to the right. The hook 77b contacts the first cam portion 83a. An end portion 78e extends from the delay lever 78. When the shutter mechanism is charged, the friction projection 77c contacts the end portion 78e, to block rotation of the shutter drive lever 77 in the counterclockwise direction.

A pivot 11d protrudes from the main body 11, and supports the retention lever 76 in a rotatable manner. A torsion coil spring 86 biases the retention lever 76 in the clockwise direction. In the retention lever 76 are formed a retention claw 76a, a projection 76b, a release portion 76c and a retention claw 76d. When the shutter mechanism is charged, the retention claw 76a becomes engaged with the notch 82a in the cam 80, and blocks rotation of the retention lever 76. The retention lever 76 slightly rotates in the clockwise direction, so the retention claw 76d becomes engaged with the winder wheel 35 and blocks rotation of the winder wheel 35. When the shutter release button 27 is depressed, a transmission projection 27a extending down from the shutter release button 27 pushes the release portion 76c. See FIG. 5. The retention lever 76 rotates in the counterclockwise direction against the bias of the torsion coil spring 85. Thus, the retention lever 76 becomes disengaged from the notch 82a in the cam 80 and from the winder wheel 35.

A pivot 50e projects from the light-shielded tunnel 50, and supports the delay lever 78 in a rotatable manner. A torsion coil spring 87 biases the delay lever 78 in a counterclockwise direction. In the delay lever 78 are formed a tooth train portion 78a, a second blocking pin 78b, a retention projection 78c and a cam follower 78d. The retention projection 78c contacts the projection 76b of the retention lever 76. The cam follower 78d contacts the third cam portion 83c. An arm extends from an end of the tooth train portion 78a, and is formed in a shape of a semi-circle. The second blocking pin 78b projects down from an end of the arm. In the photometric switch 44 having a first switch segment 44b and a second switch segment 44a, the second blocking pin 78b blocks the second switch segment 44a at the time of not charging the shutter mechanism. So the second blocking pin 78b prevents the photometric switch 44 from being turned on accidentally. See FIG. 5. At the time of shutter charging, the end portion 78e comes into the rotating path of the friction projection 77c of the shutter drive lever 77, and retains the friction projection 77c so as to prevent the shutter drive lever 77 from swinging in the counterclockwise direction.

An ankle 91 is combined with the switch gear 90, to constitute the governor mechanism 81. A pivot 50f protrudes from the light-shielded tunnel 50, and supports the switch gear 90 in a rotatable manner. The switch gear 90 is constituted by transmission gear portion 90a, an escapement wheel portion 90b, a retention ridge 90c, the shifting projection 90d and a blocking pin 90e as a first blocking mechanism. The transmission gear portion 90a is meshed with the tooth train portion 78a of the delay lever 78. Rotation of the delay lever 78 causes the switch gear 90 to rotate in a driven manner. The ankle 91 is engaged with the escapement wheel portion 90b, and regulates a rotational speed of the switch gear 90. The shifting projection 90d, while the switch gear 90 rotates clockwise, pushes the second switch segment 44a to the first switch segment 44b and turns on the photometric switch 44. See FIG. 7. At the time of charging the shutter mechanism, the blocking pin 90e blocks the second switch segment 44a to avoid turning on the photometric switch 44 accidentally. See FIG. 5.

A pivot 50g projects from the light-shielded tunnel 50, and supports the transmission lever 79 in a rotatable manner. A torsion coil spring 92 biases the transmission lever 79 in the counterclockwise direction. An arm 79a and a retention projection 79b are formed with the transmission lever 79. A contact surface 79c is formed with an end portion of the arm 79a. A driven portion 79d is formed with a lower end portion of the arm 79a. The contact surface 79c contacts the second cam portion 83b, and also blocks rotation of the cam 80 in the clockwise direction at the time of shutter charging. The driven portion 79d contacts the retention ridge 90c of the switch gear 90. The retention projection 79b contacts the engagement projection 67b of the stop changer lever 67.

The operation of the above embodiment is described with reference to FIGS. 5–12. In FIGS. 5–12, the torsion coil spring 66, the return spring 69d, the torsion coil springs 71, 85–87 and 92 are eliminated only for the purpose of simplifying the depiction.

Figure 5:
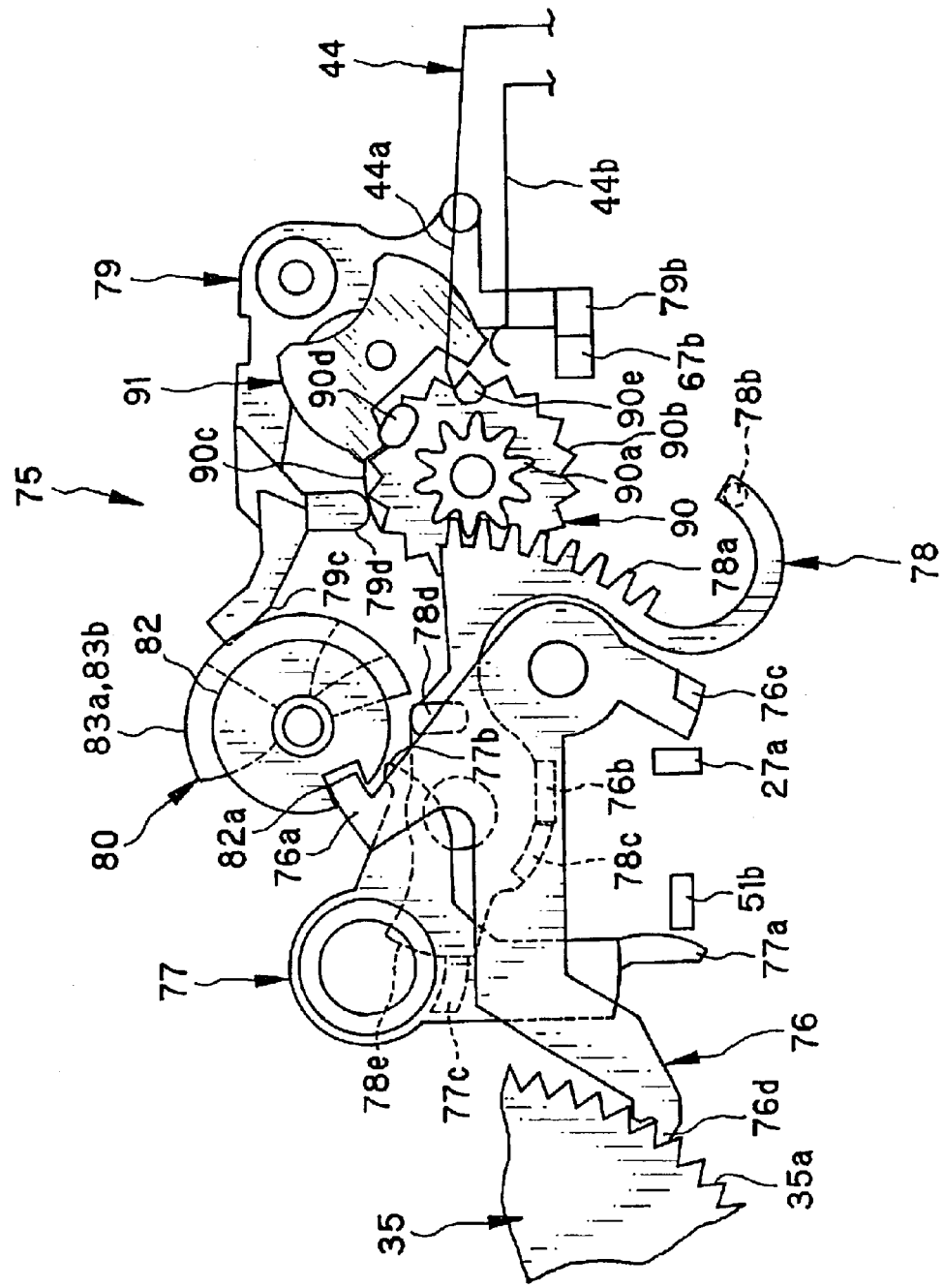
FIG. 5 is an explanatory view in top plan illustrating the shutter mechanism.

In FIG. 5, the shutter mechanism 75 after being charged is illustrated. In the retention lever 76, the retention claw 76a is engaged with the notch 82a to block rotation of the cam 80. The winder wheel 35 has peripheral teeth 35a, with which the retention claw 76d is engaged to block rotation of the winder wheel 35. The delay lever 78 is kept positioned as illustrated by engagement between the retention projection 78c and the projection 76b. At the same time, the blocking pin 90e of the switch gear 90 contacts the second switch segment 44a to keep the photometric switch 44 turned off. The photometric switch 44 remains turned off even shock or vibration occurs to the photometric switch 44.

Figure 6:
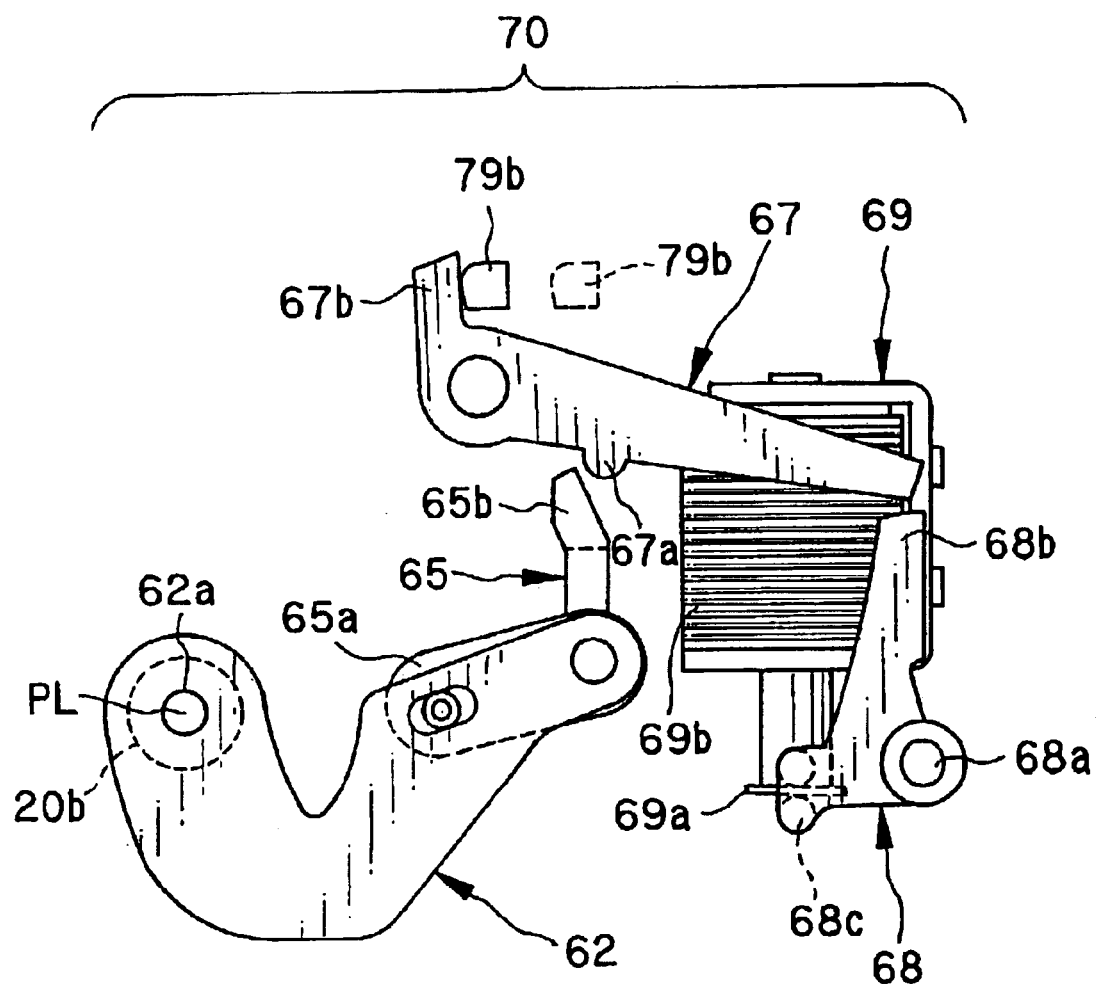
FIG. 6 is an explanatory view in front elevation, illustrating an aperture stop changer mechanism.

The transmission lever 79 is prevented from rotating counterclockwise as the driven portion 79d contacts the retention ridge 90c of the switch gear 90. In FIG. 6, the engagement projection 67b of the stop changer lever 67 is prevented from moving toward the right. An end of the stop changer lever 67 is kept at a small distance from the projection 68b of the stopper lever 68. There is no accidental rotation of the stop changer lever 67 in the clockwise direction even shock or vibration causes the stopper lever 68 to rotate to the non-retention position.

Figure 7:
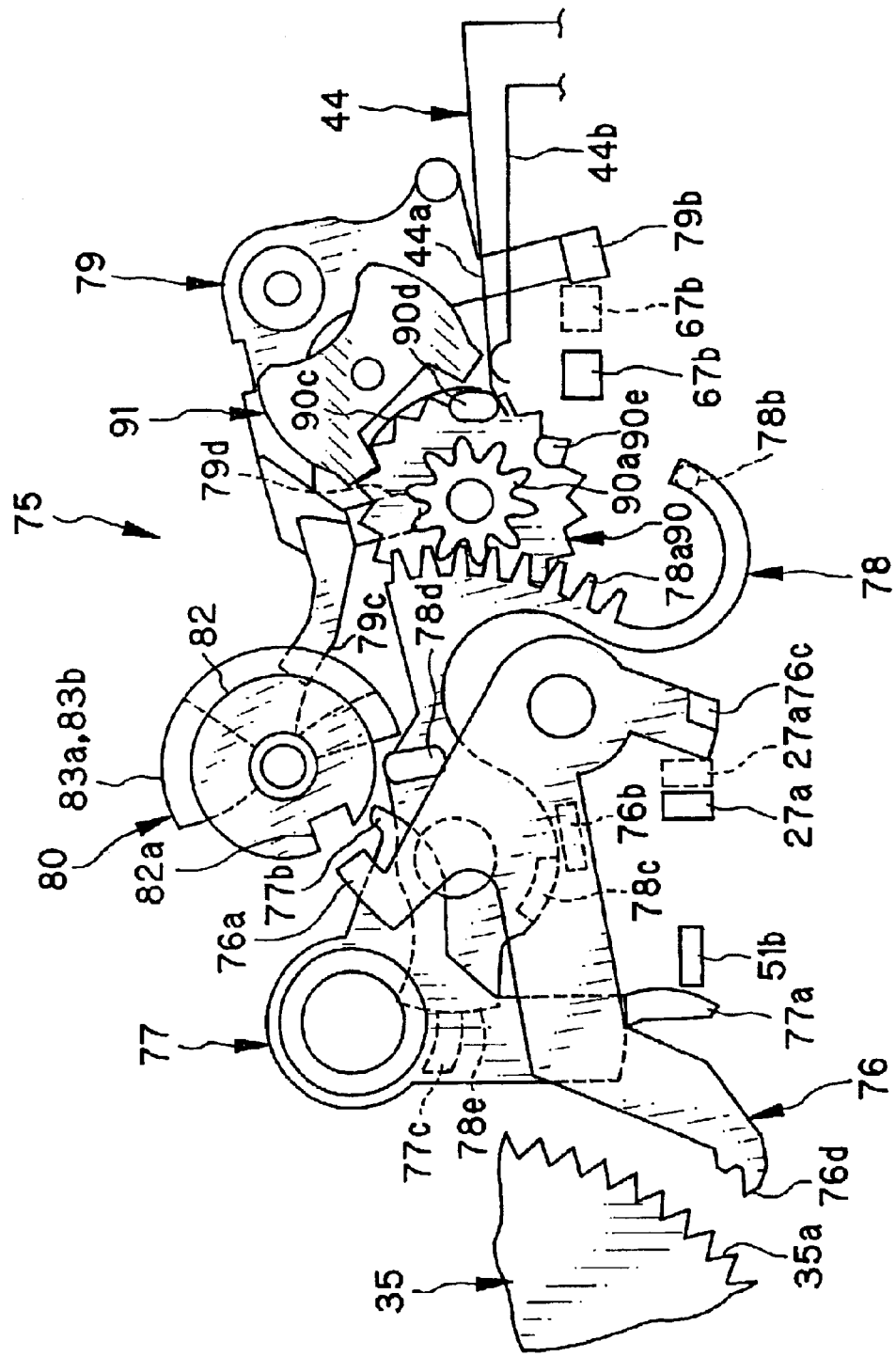
FIG. 7 is an explanatory view in top plan illustrating the same as FIG. 5 but at the time of turning on a photometric switch.

When a user depresses the shutter release button 27, the transmission projection 27a moves from the position of the solid line to that of the phantom line. See FIG. 7. The shift of the transmission projection 27a pushes the release portion 76c to the right to rotate the retention lever 76 in the counterclockwise direction. Responsively, the projection 76b comes away from the retention projection 78c to rotate the delay lever 78 in the counterclockwise direction. Simultaneously, the switch gear 90 rotates in the clockwise direction. The retention ridge 90c is caused to come away from the driven portion 79d, to rotate the transmission lever 79 in the counterclockwise direction. In FIG. 6, the retention projection 79b moves from the position of the solid line to that of the phantom line, and comes away from the engagement projection 67b. The stop changer lever 67 rotates in the clockwise direction to a small extent. An end portion of the stop changer lever 67 contacts the projection 68b of the stopper lever 68. In FIG. 7, the shifting projection 90d depresses the second switch segment 44a to the first switch segment 44b, and turns on the photometric switch 44. Thus, the photometric circuit is operated to measure object brightness.

Figure 8:
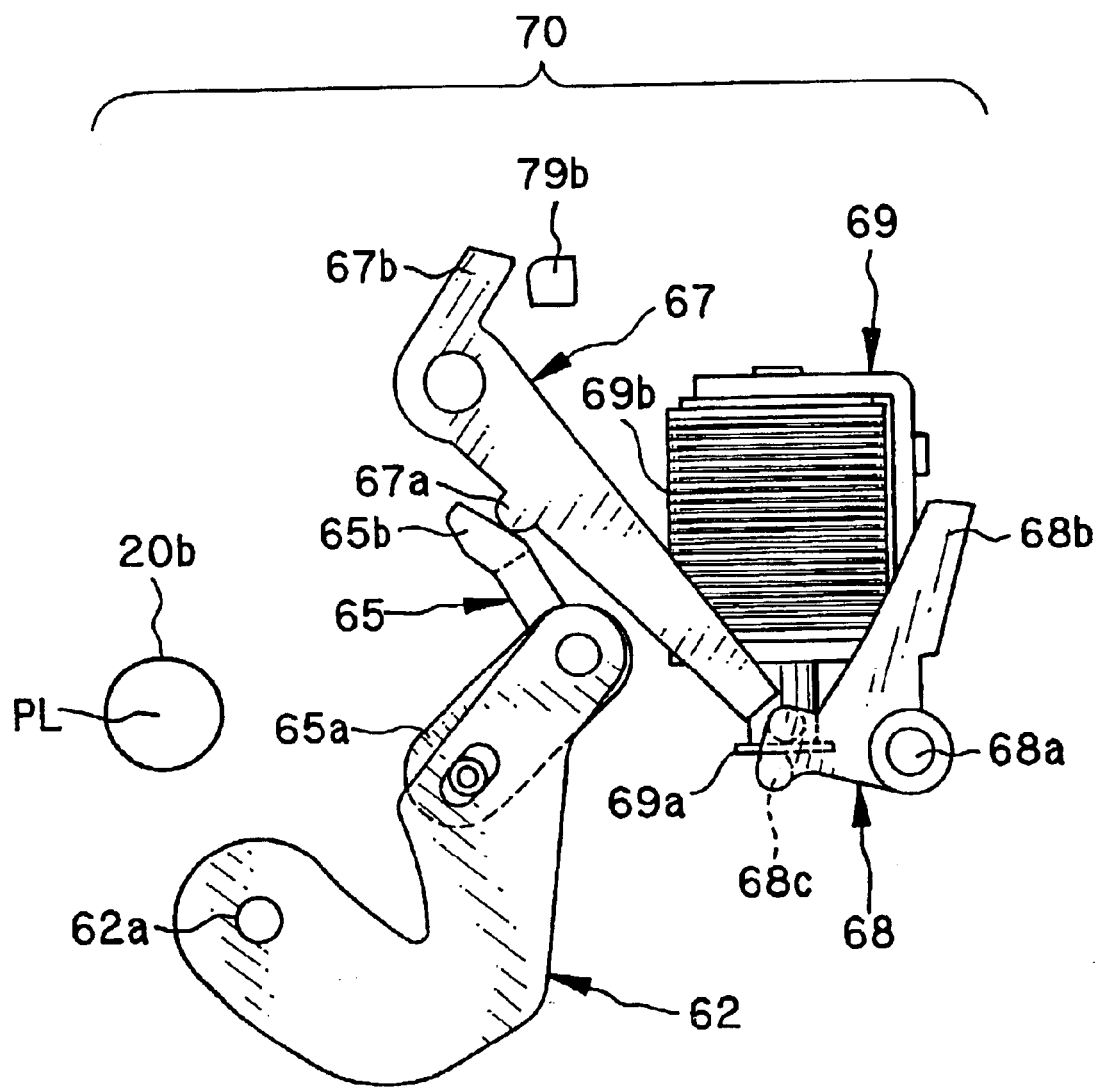
FIG. 8 is an explanatory view in front elevation, illustrating the aperture stop changer mechanism shifted in a large aperture state.
Figure 9:
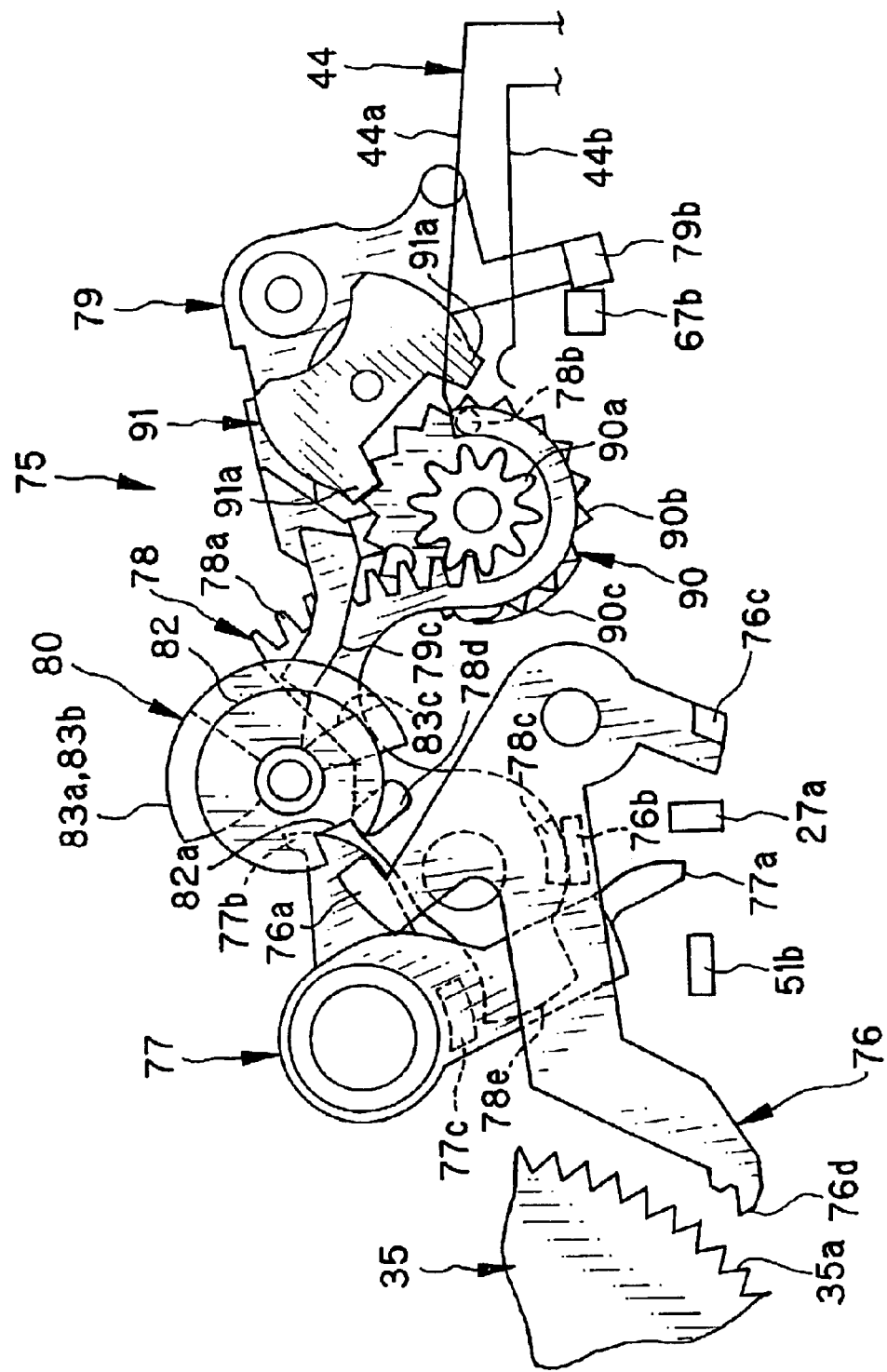
FIG. 9 is an explanatory view in top plan illustrating the same as FIG. 5 but upon completion of releasing the shutter mechanism.
Figure 10:
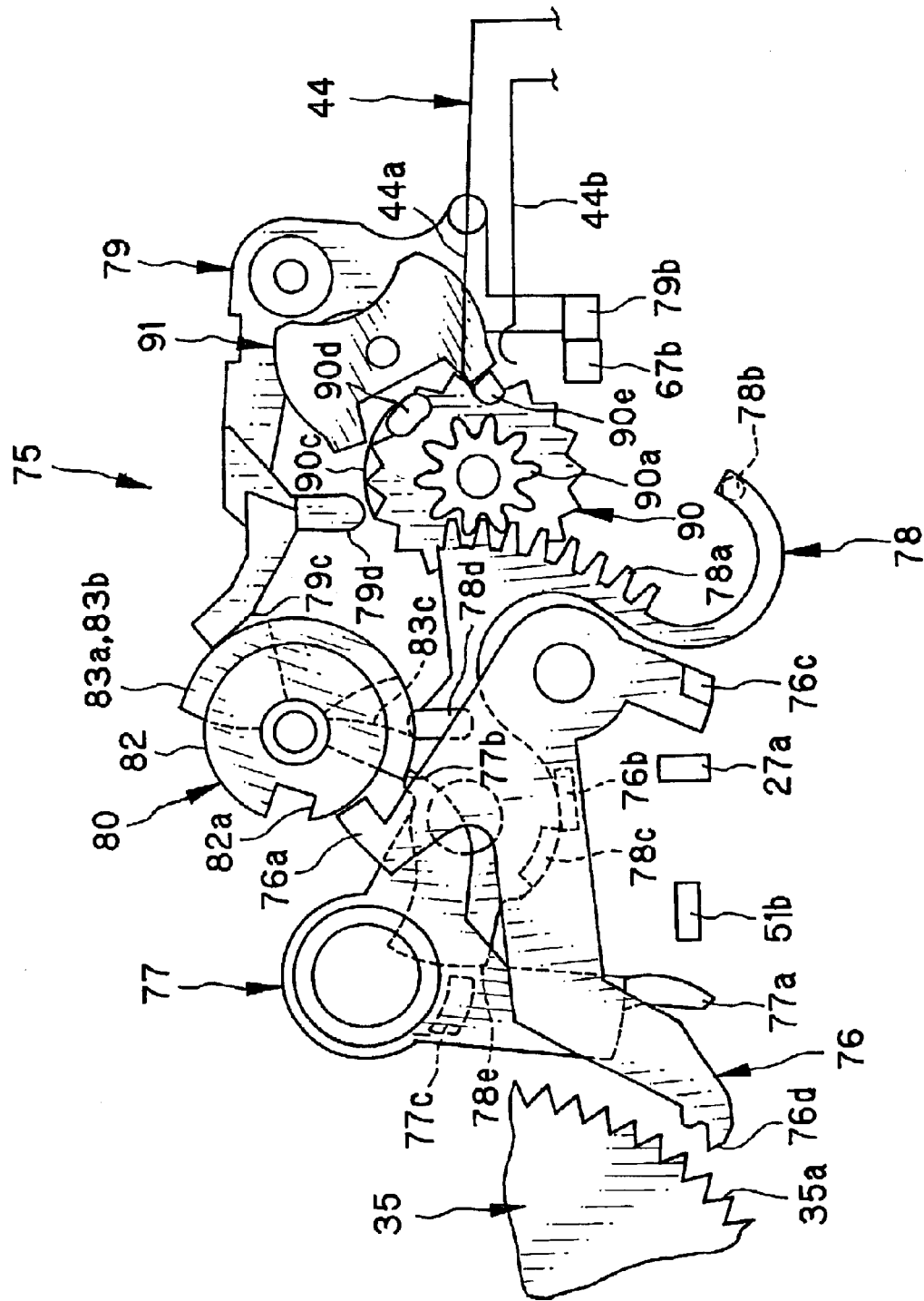
FIG. 10 is an explanatory view in top plan illustrating the same as FIG. 5 but in the course of advancing the photo film.

If the measured object brightness is equal to or higher than the predetermined level, no energy is applied to the solenoid 69. As the stopper lever 68 is in the retention position, the movable aperture stop plate 62 is kept in the small aperture position where the small stop opening 62a is set in the light path PL. If, in contrast, the measured object brightness is lower than the predetermined level, electric energy is applied to the solenoid 69. In FIG. 8, the plunger 69a is moved to the inside of the winding 69b to rotate the stopper lever 68 to the non-retention position. The stop changer lever 67 rotates clockwise. The driving projection 67a pushes the driven portion 65b to the left to rotate the driven arm 65 in the counterclockwise direction. Consequently, the movable aperture stop plate 62 swings to the large aperture position where the small stop opening 62a is away from the light path PL.

When the delay lever 78 rotates in the counter clockwise direction by a predetermined rotational amount, the end portion 78e shifts away from the friction projection 77c. The shutter drive lever 77 rotates in the counterclockwise direction. See FIG. 9. This rotation causes the knocking arm 77a to knock the driven portion 51b of the shutter blade 51 in the direction toward the right, to open and shut the shutter opening 50a. An exposure is taken to the photo film 17. Consequently, a photograph is taken by releasing the shutter mechanism after changing over the aperture stop according to the object brightness.

When the release of the shutter mechanism is completed, the projection 76b of the retention lever 76 contacts the retention projection 78c, to retain the retention claw 76d in a position away from the peripheral teeth 35a. The contact surface 79c of the transmission lever 79 contacts and is retained by the second cam portion 83b. The knocking arm 77a of the shutter drive lever 77 is positioned to the right of the driven portion 51b of the shutter blade 51. The second blocking pin 78b of the delay lever 78 contacts the second switch segment 44a in the photometric switch 44 to turn off the photometric switch 44, and prevents the photometric switch 44 from turning on even upon occurrence of shock or vibration. If the aperture stop is not changed over for an exposure, the engagement projection 67b of the stop changer lever 67 is positioned as indicated by the solid line in FIG. 7, and retained by the retention projection 79b. If the aperture stop is changed over, the engagement projection 67b remains positioned as indicated by the phantom line in FIG. 7.

When the winder wheel 35 is rotated for taking another exposure, the cam 80 is rotated in the counterclockwise direction by movement of the photo film 17. See FIG. 10. During rotation of the cam 80, the first cam portion 83a pushes the hook 77b to rotate the shutter drive lever 77 in the clockwise direction. Accordingly, the knocking arm 77a reaches to a position that is to the left of the driven portion 51b of the shutter blade 51.

The third cam portion 83c pushes the cam follower 78d to rotate the delay lever 78 in the clockwise direction. At the same time, the switch gear 90 rotates in the counterclockwise direction. The shifting projection 90d pushes the second switch segment 44a in the photometric switch 44 to raise the same to the position higher than that indicated by the solid line. When the switch gear 90 rotates at a predetermined amount, the shifting projection 90d comes away from the second switch segment 44a, which returns to its original position.

Figure 11:
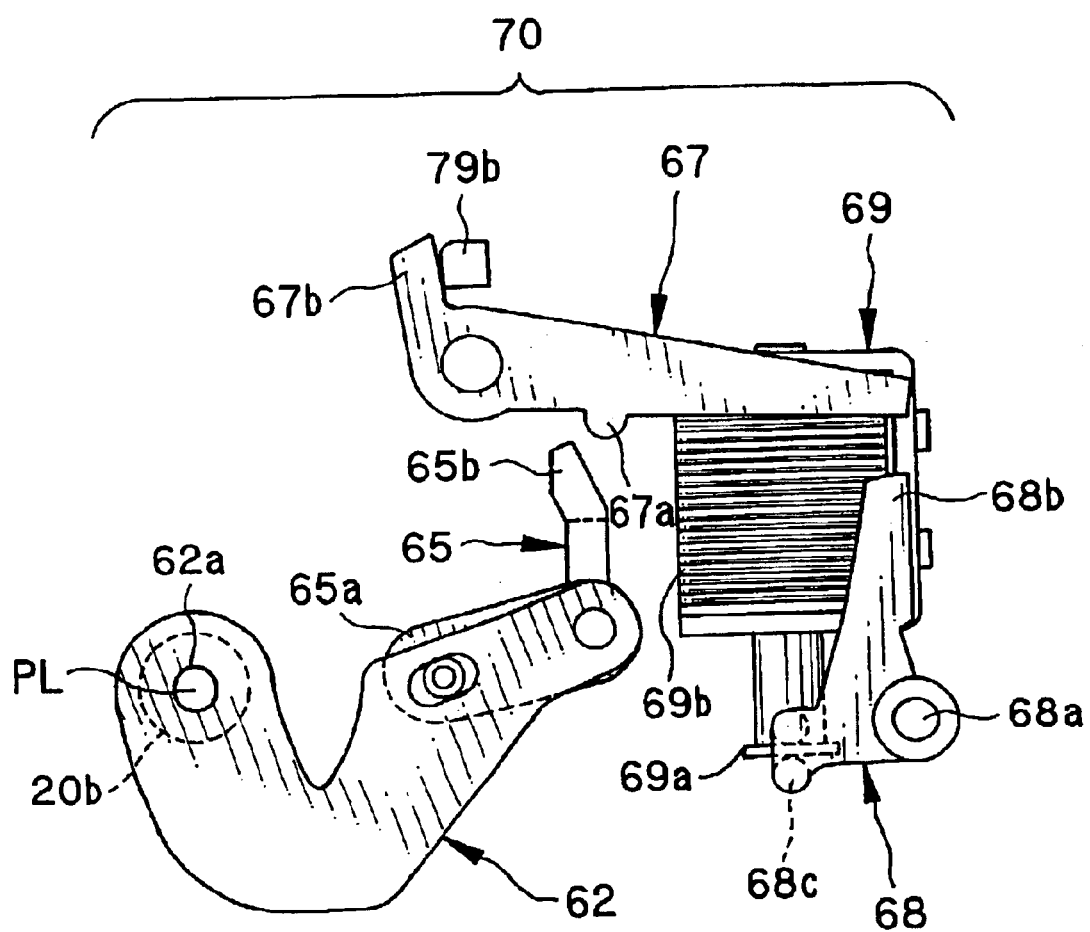
FIG. 11 is an explanatory view in front elevation, illustrating the same as FIG. 8 but shifted in a small aperture state.
Figure 12:
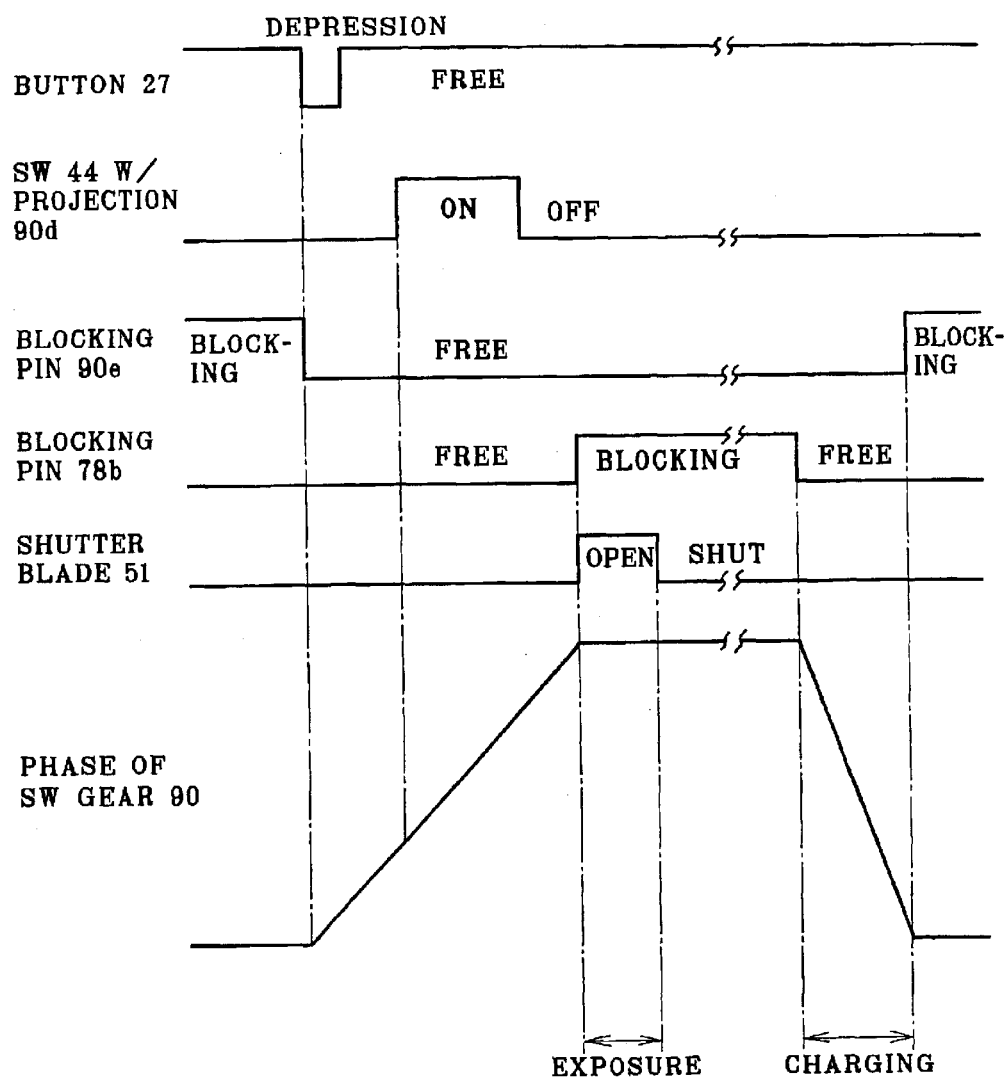
FIG. 12 is a timing chart illustrating a sequence of operating steps of elements including a shutter release button, a switch gear and a shutter blade.

The second cam portion 83b pushes the contact surface 79c to rotate the transmission lever 79 in the clockwise direction. Thus, the retention projection 79b pushes the engagement projection 67b of the stop changer lever 67 and moves the same to a position that is sufficiently distant from the initial position on the left side. In FIG. 11, an end of the stop changer lever 67 is raised by the projection 68b of the stopper lever 68. The movable aperture stop plate 62 is set in the small aperture position where the small stop opening 62a is located in the light path PL. As the photometric circuit does not operate, the stopper lever 68 is in the retention position to block rotation of the stop changer lever 67.

The cam 80 further rotates in the counterclockwise direction. The retention projection 78c comes away from the projection 76b to rotate the retention lever 76 in the clockwise direction. The retention claw 76a becomes engaged with the notch 82a. The retention claw 76d becomes engaged with the peripheral teeth 35a. The charge of the shutter mechanism is completed as illustrated in FIG. 5, to stand by for another exposure.

Note that, in the switch gear 90, the shifting projection 90d and the blocking pin 90e project from the escapement wheel portion 90b according to the above embodiment. However, the shifting projection 90d and the blocking pin 90e may project from positions in the transmission gear portion 90a at its middle height.

In the above embodiment, the lens-fitted photo film unit with the structure according to the invention is described. However, the structure of the invention may be incorporated in a camera of any type. In the above embodiment, the photo film is IX240 type. However, the photo film used in the invention may be 135 type or any type of a strip shape.

The feature of the friction mechanism is hereinafter described in detail, including the friction projection 77c and the torsion coil spring 85 for braking the delay lever 78 to determining sufficient delay time. The shutter release button 27 is depressed. When the delay time of a predetermined value lapses after the depression, the driven portion 51b of the shutter blade 51 is knocked by the knocking arm 77a toward the right.

The end portion 78e enters a rotational path of the friction projection 77c after the shutter charging until a swing of the delay lever 78 at a predetermined phase difference. The end portion 78e retains the friction projection 77c and prevents the shutter drive lever 77 from rotating counterclockwise. When the shutter release button 27 is depressed, the projection 76b is shifted away from the retention projection 78c to rotate the delay lever 78 by a predetermined phase difference. Then the end portion 78e is shifted away from the friction projection 77c to allow the shutter drive lever 77 to rotate. The time required after the depression of the shutter release button 27 until the swing of the delay lever 78 at a predetermined phase difference is determined as delay time additionally passed before the shutter releasing. The delay time is determined by a rotational speed of the delay lever 78.

In the light-shielded tunnel 50, a pivot 50k supports the ankle 91 in a rotatable manner. The ankle 91 is engaged with the escapement wheel portion 90b in the switch gear 90. Projections 91a and 91b are included in the ankle 91, opposed to the switch gear 90, and become engaged with the escapement wheel portion 90b alternately. Thus, the ankle 91 regulates a rotational speed of the delay lever 78 by means of the switch gear 90.

A friction mechanism for the delay lever 78 is constituted by the friction projection 77c and the torsion coil spring 85. The friction mechanism provides frictional force suitable for the bias of the torsion coil spring 85 when the friction projection 77c contacts the end portion 78e. The frictional force can regularize the rotational speed of the delay lever 78 in contrast with a construction without the friction mechanism, because the ankle 91 of a plastic material is too lightweight to control the delay time. The combination of the friction mechanism and the governor mechanism 81, therefore, keeps the delay time unchanged as the rotational speed of the delay lever 78 can be regulated at the constant speed level.

The feature of changing over the aperture stop by means of the stop changer lever 67 and the movable aperture stop plate 62 is described now in detail. In the base board 55 for the sync switch 43, the boss 55b supports the stop changer lever 67, which is disposed flush with a moving path of the driven portion 65b of the driven arm 65. The stop changer lever 67 swings between first and second angular positions, and when in the first angular position, is retained by the stopper lever 68 as illustrated in FIG. 6, and when in the second angular position, causes the driving projection 67a to push the driven portion 65b of the driven arm 65 as illustrated in FIG. 8.

A process of assembling the lens-fitted photo film unit with the aperture stop changer is described now. Each of the exposure unit 15, the flash unit 12 and the lens unit 52 is obtained from respective assembling processes, and is supplied to a process of assembling the lens-fitted photo film unit 10. In a mechanical assembling step, elements are mounted on the light-shielded tunnel 50 in the exposure unit 15, including the shutter mechanism, the viewfinder mechanism and the frame counter mechanism. Similarly, elements are mounted on the base member 60 in the lens unit 52, including the spacer ring 61, the movable aperture stop plate 62, the stationary aperture stop ring 63 and the lens retention panel 64. In an electrical assembling step, various elements are positioned on and soldered to the flash circuit board 39 in the flash unit 12, including the main capacitor 36, the CdS element 37, the photometric element 38, the flash charger switch 42, the sync switch 43, the photometric switch 44, the solenoid 69 and the like. Also, mechanical elements are secured to the flash unit 12, including the stop changer lever 67 and the stopper lever 68.

In assembling the lens-fitted photo film unit, the light-shielded tunnel 50 is secured to the main body 11 at first. The lens unit 52 is secured to the front of the light-shielded tunnel 50, to obtain the exposure unit 15. After this, the boss 55b is inserted in the receiving hole 11c in the main body 11, to fasten the flash unit 12 to the exposure unit 15. The sync switch 43 is positioned in a moving path of the switching portion 51c of the shutter blade 51. The photometric switch 44 is positioned in a moving path of the shifting projection 90d. The stop changer lever 67 is positioned flush with a moving path of the driven portion 65b of the driven arm 65.

After the flash unit 12 is secured, the battery 41, the operation button 46 and the shutter release button 27 are positioned and secured. The photo film cassette 16 and the photo film 17 are inserted before the front cover 13 and the rear cover 14 are secured to the outside of the main body 11. Thus, the lens-fitted photo film unit 10 is obtained.

In the above embodiment, the solenoid 69 is driven according to object brightness, to shift the movable aperture stop plate 62 into and out of the light path. However the aperture stop changer mechanism 70 can have an externally operable button member, which can be moved to rotate the stop changer lever 67 for changing over the aperture stop.

In the above embodiment, the actuator for changing over the aperture stop is the solenoid. However, a motor as an actuator can be used for shifting the movable aperture stop plate 62.

Figure 13:
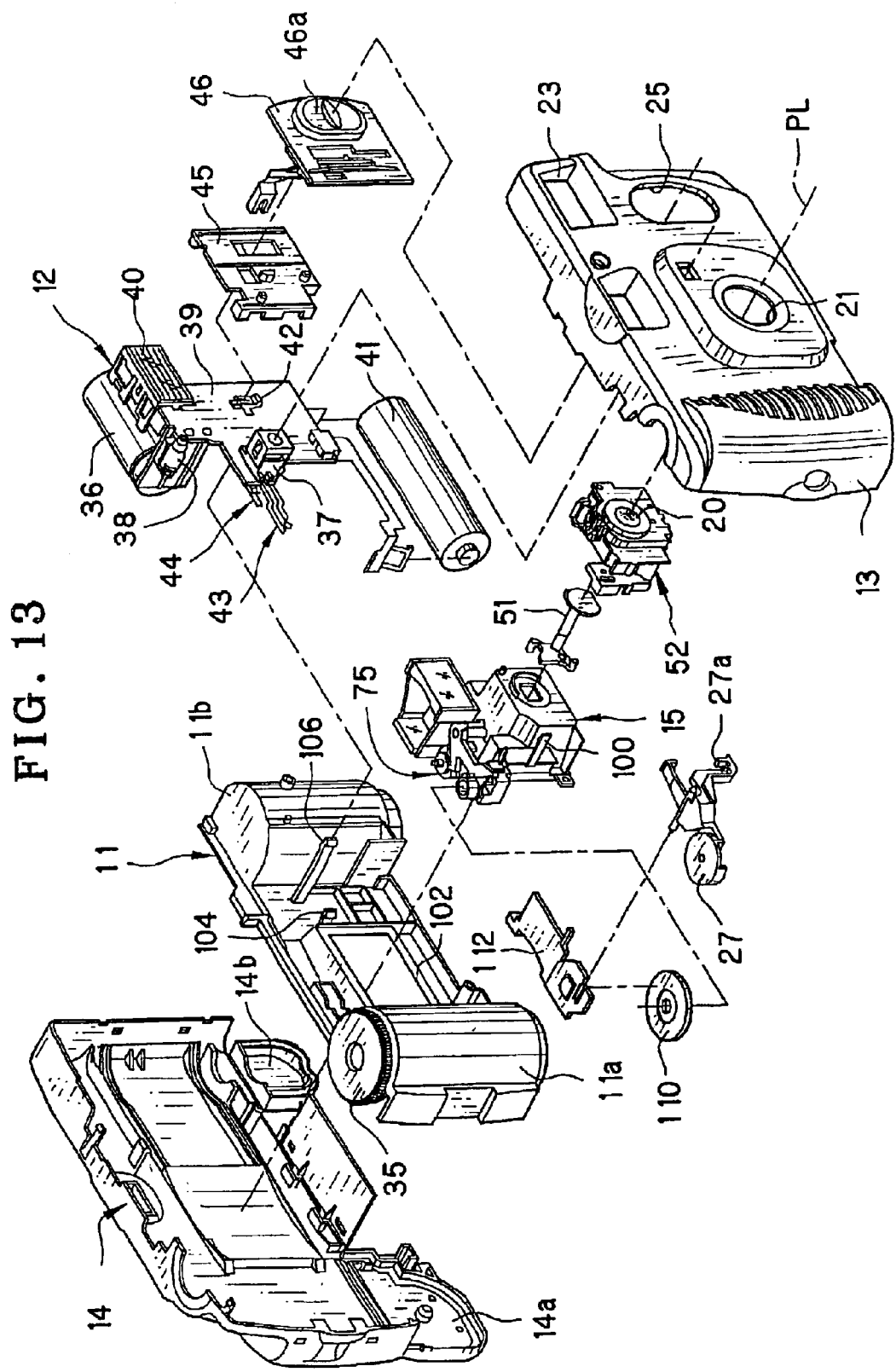
FIG. 13 is an exploded perspective illustrating the lens-fitted photo film unit in which the exposure unit is in a state separated from the main body.
Figure 14:
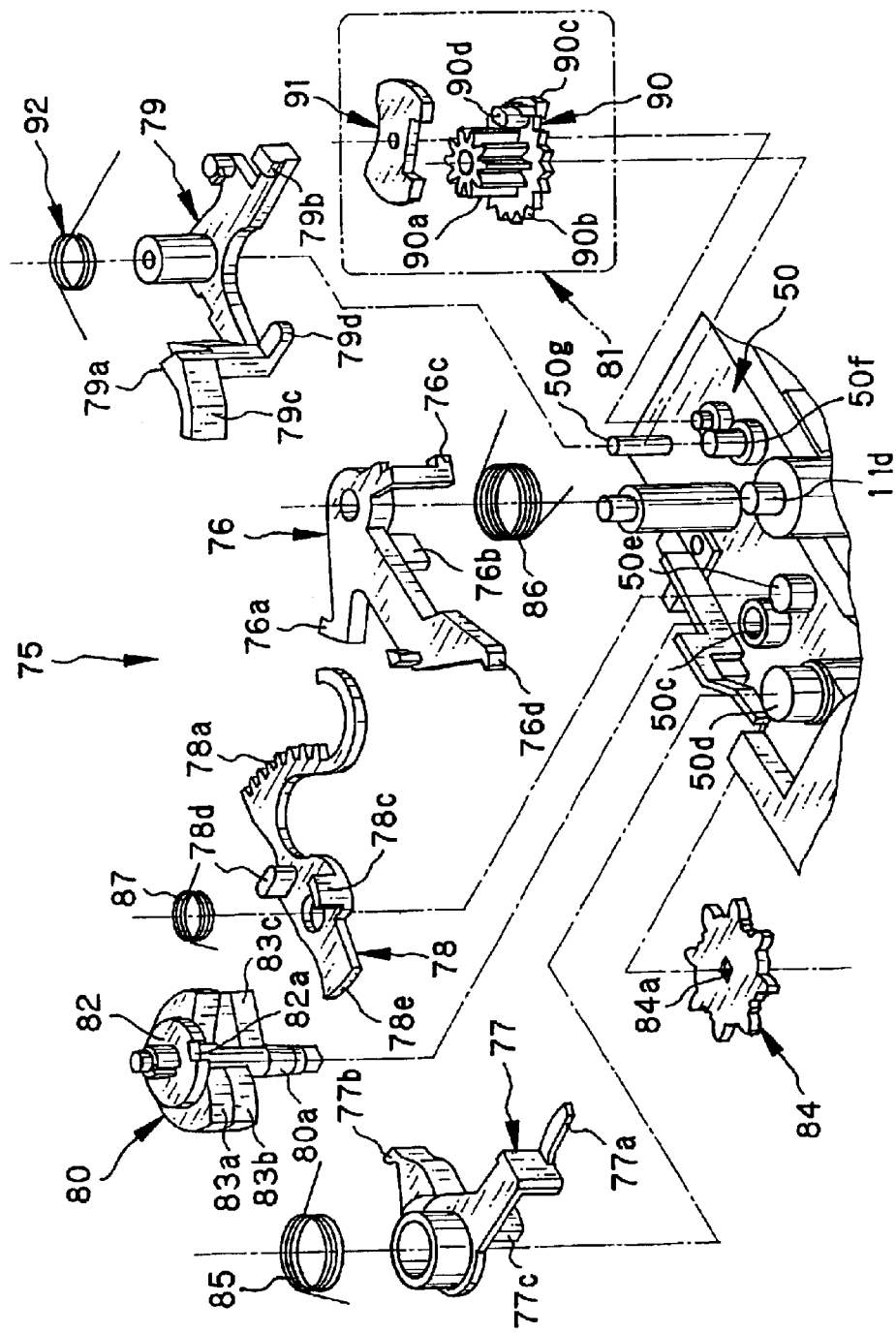
FIG. 14 is an exploded perspective illustrating a shutter mechanism in the lens-fitted photo film unit and which does not have the blocking pins.
Figure 15:
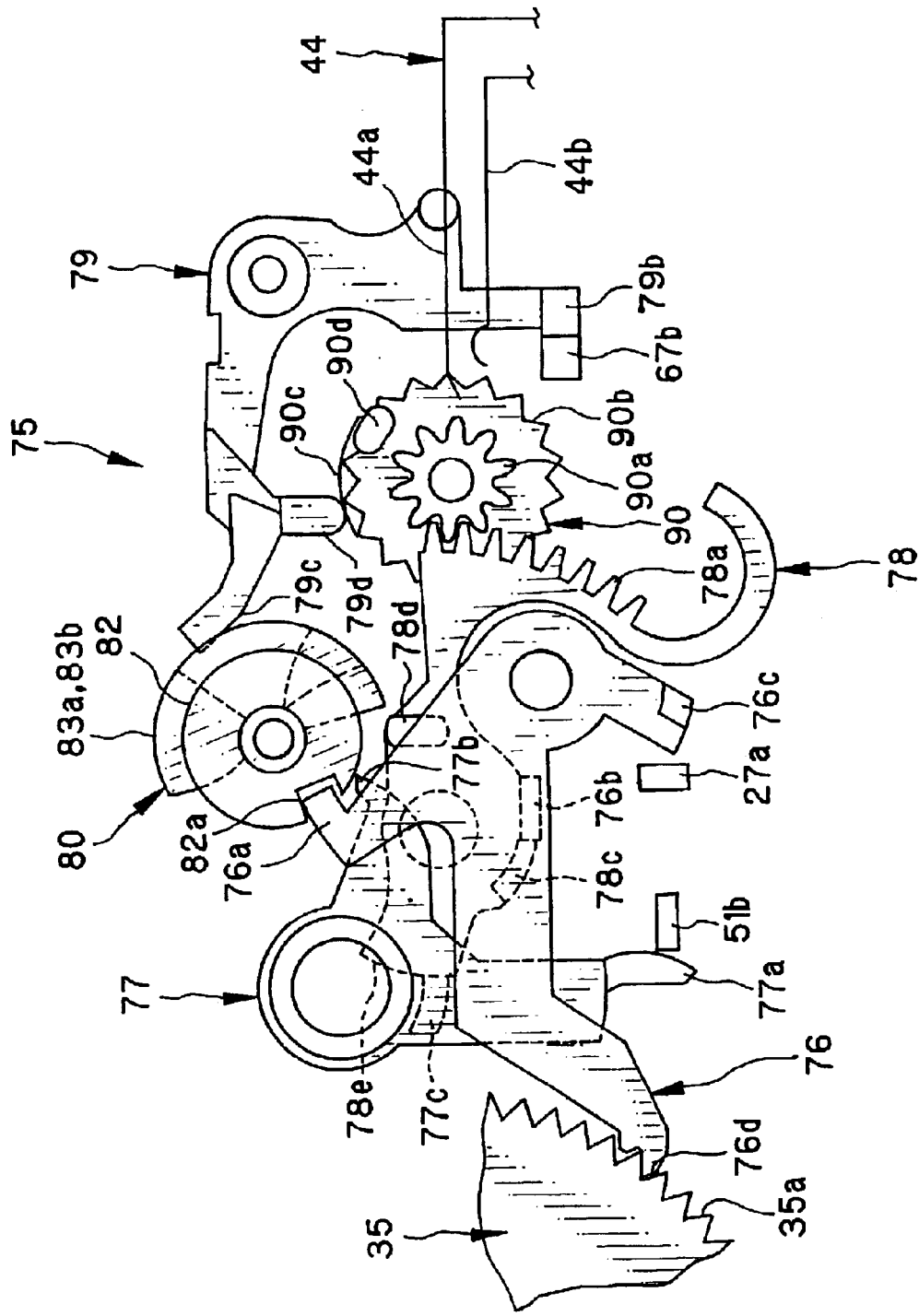
FIG. 15 is an explanatory view in top plan illustrating the shutter mechanism of FIG. 14.

Referring now to FIGS. 13–15, the feature of the triple unit structure with the exposure unit 15, the lens unit 52 and the flash unit 12 is hereinafter described in detail. An exposure aperture 102 is formed in the center of the main body 11 for defining one frame region in front of the photo film. The exposure aperture 102, the exposure unit 15 and the lens unit 52 are arranged in sequence along the light path PL. A retention hook 104 extends from the main body 11, and retains the exposure unit 15 to the main body 11. A retention hook 100 extends from the exposure unit 15, and retains the lens unit 52 to the exposure unit 15. The flash unit 12 is disposed beside the exposure unit 15. A retention hook 106 extends from the main body 11, and fastens the flash unit 12 to the main body 11.

Note that the movable aperture stop plate 62 may have a large stop opening in addition to the small stop opening 62a. The movable aperture stop plate 62, when set in the small aperture position, can set the small stop opening 62a in the light path PL, and when in the large aperture position, can set the large stop opening in the light path PL in place of the small stop opening 62a, so as to change over the large and small aperture stop states.

In FIG. 13, a frame counter disk 110 and a retention panel 112 are secured to the light-shielded tunnel 50 in the exposure unit 15 in addition to the shutter blade 51, the shutter mechanism 75 and the viewfinder.

When development of the photo film is desired by a user after taking all exposures, the lens-fitted photo film unit 10 is forwarded to a photo laboratory. The bottom lid 14a is opened in the photo laboratory, to remove the cassette with the photo film. The photo film is processed, and subjected to producing photographic prints.

The lens-fitted photo film unit 10 from which the cassette is removed is collected from a laboratory to a recycling factory. In the recycling factory, the front cover 13 and the rear cover 14 are removed. After this, the lens unit 52, the flash unit 12 and the exposure unit 15 are removed from the main body 11, and reused. There is no soldering between the lens unit 52, the flash unit 12 and the exposure unit 15 by any wires or boards. The retention hooks 100, 104 and 106 can be disengaged from one another to remove the lens unit 52, the flash unit 12 and the exposure unit 15 from the main body 11.

In the above embodiment, the movable aperture stop plate 62 is movable into and out of a space between the front lens element 20a and the rear lens element 20b. However, a space may be defined behind the taking lens 20. The aperture stop changer mechanism 70 can have the movable aperture stop plate 62 movable into and out of the space.

Note that the lens-fitted photo film unit according to FIGS. 13–15 does not include the blocking pin 90e and the second blocking pin 78b according to FIGS. 4–12. However, the use of the triple unit structure according to the present invention is effective in the lens-fitted photo film unit including the blocking pin 90e and the second blocking pin 78b.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A shutter device comprising:

a shutter release button;

a delay lever for moving from a charged position toward a released position during lapse of a delay time in response to depression of said shutter release button;

a shutter drive lever for moving from a first position toward a second position when said delay lever reaches said released position;

a shutter blade, driven by said shutter drive lever moving toward said second position, for opening and shutting a photographic light path;

a friction mechanism for providing braking operation to said delay lever by frictional contact therewith, to set said delay time long.

2. A shutter device as defined in claim 1, further comprising:

a tooth train portion formed with said delay lever;

a governor mechanism, meshed with said tooth train portion, for regulating rotation at a predetermined speed, to set said delay time long.

3. A shutter device as defined in claim 2, wherein said friction mechanism includes:

a bias spring for biasing said shutter drive lever toward said second position;

a friction portion, formed with said shutter drive lever, and pressed against said delay lever by said bias spring.

4. A shutter device as defined in claim 3, wherein said governor mechanism includes:

a transmission gear portion, meshed with said tooth train portion, for rotating;

an escapement wheel portion, formed with said transmission gear portion, for constituting a switch gear;

an ankle member, meshed with said escapement wheel portion, for restricting rotation thereof.

* * * * *